L. S. WHITNEY.
BLANK FOR MAKING RAKES AND FORKS.
APPLICATION FILED MAR. 25, 1910. RENEWED OCT. 25, 1913.
1,142,000.
Patented June 8, 1915.
2 SHEETS—SHEET 2.
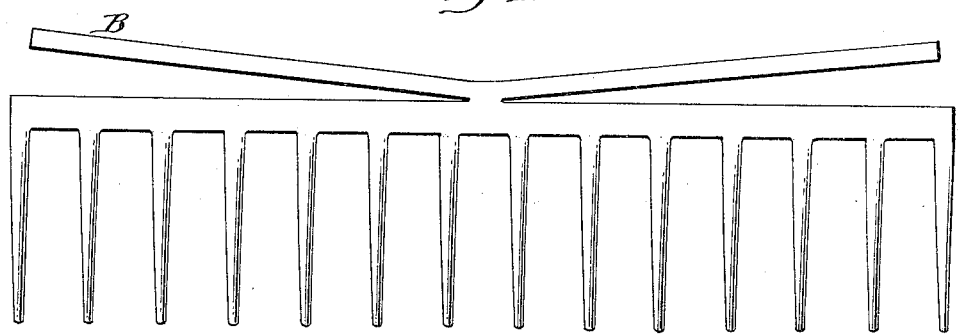
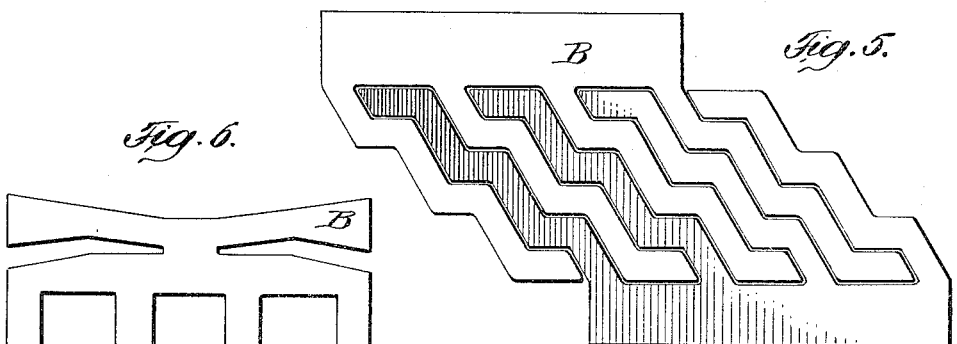
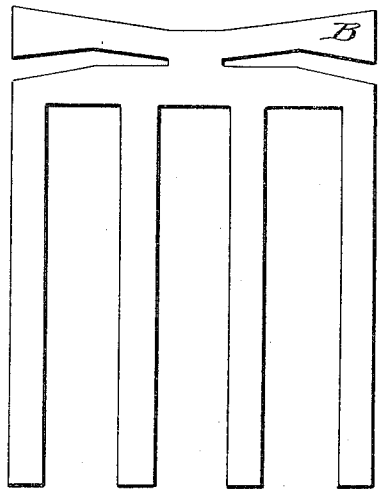
WITNESSES:
INVENTOR
Larned S. Whitney
BY
ATTORNEY

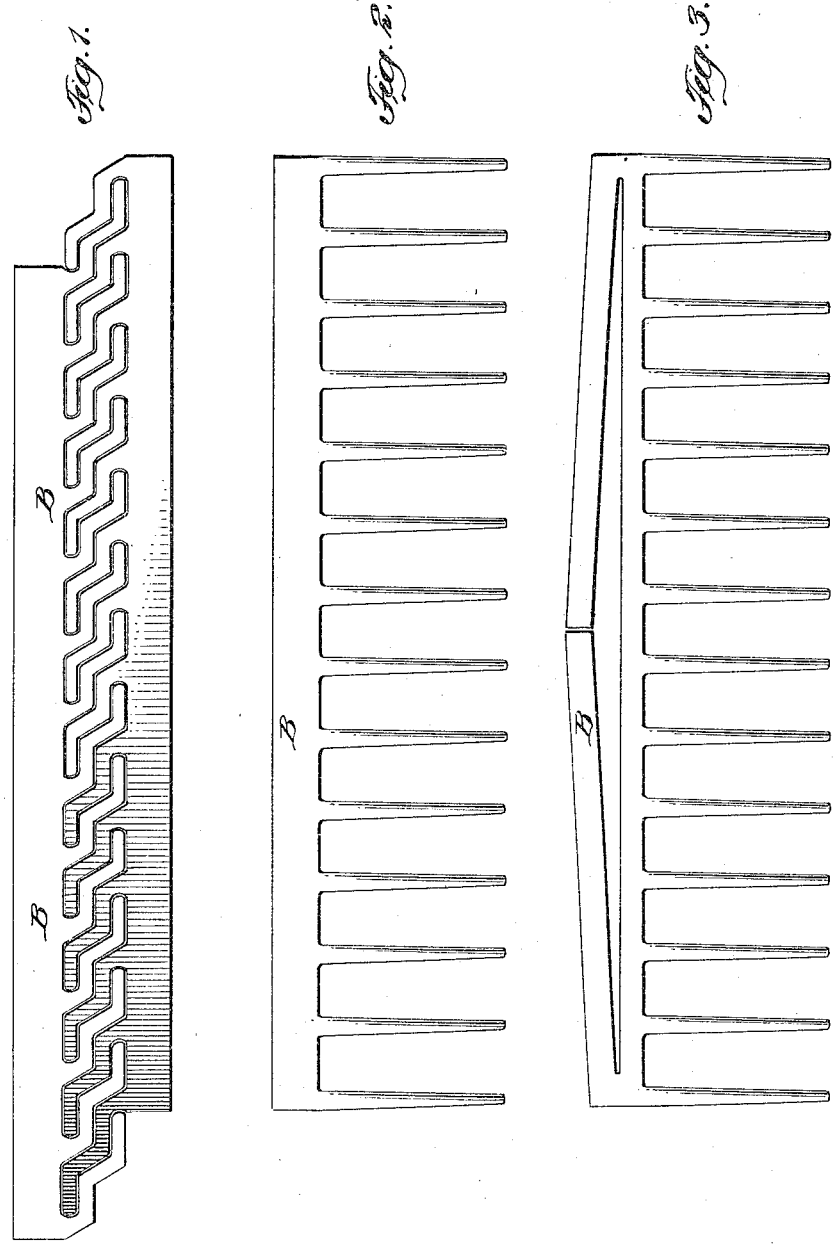

UNITED STATES PATENT OFFICE.

LARNED S. WHITNEY, OF WALLINGFORD, VERMONT.

BLANK FOR MAKING RAKES AND FORKS.

1,142,000. Specification of Letters Patent. Patented June 8, 1915.

Application filed March 25, 1910, Serial No. 551,442. Renewed October 25, 1913. Serial No. 797,329.

*To all whom it may concern:*

Be it known that I, LARNED S. WHITNEY, a citizen of the United States, residing at Wallingford, in the county of Rutland and State of Vermont, have invented new and useful Improvements in Blanks for Making Rakes and Forks, of which the following is a specification.

The invention relates to the manufacture of the several varieties of steel rakes, forks and hooks and the like. It is applicable to all implements of that character, but it is sufficient to set forth its application to illustrative examples, the application of the invention to other implements of the kind being apparent therefrom.

In the accompanying drawings the application of the invention to typical rakes and forks is illustrated.

Figure 1 is a plan view of a sheet or bar of metal cut to form two rake blanks in accordance with my invention, and Fig. 2 a like view of one of said blanks with the teeth members straightened and forged to size, length and shape; Figs. 3 and 4 are plan views of the blank shown in Fig. 2 illustrating methods of cutting the stock thereof for the head and shank to permit portions (B) of the same to be drawn and formed to make respectively a bow rake or a level head rake; Fig. 5 is a plan view of a sheet or bar of metal cut to form two blanks for four-tine spading forks, and Fig. 6 a detached plan view of one of said blanks showing its stock for the head cut for the shank and the tines straightened and ready to be forged.

The rake or fork may be given any number of teeth that may be desired and the teeth or tines may be made of any desired length and shape by obvious modifications; and by making such obvious modifications in the number, length, and proportions of the stock for the teeth or tines and in the stock for the head and shank, the invention may be applied to any implement of the kind.

The invention results in a radical saving of material, time and labor in the manufacture of such implements, at the same time improving their quality and excellence.

According to my invention, a blank is formed of such a character that stock is therein provided for the head and other portions of stock for the teeth or tines in the manner hereinafter pointed out. I prefer, also, to make provision in the blank for the shank as indicated in the drawings. Blanks for two implements are formed from a single piece of metal in order to avoid waste of material. The blank is so formed that the stock for each tooth or tine is separated from the stock for the other teeth or tines as distinguished from being merely cut or slit. The extent of this separation is exactly regulated so that all the teeth or tines may be treated simultaneously, in the manner hereinafter specified. By having the portions of stock for teeth or tines cut in such manner that the angle at which they stand to the stock for the head changes at a point some distance from the head-stock, the proper separation is secured and waste of material avoided. In Figs. 1 and 5 are shown the preferred form by which this exactly regulated separation is accomplished without loss of material, but it is plain that the precise form therein shown admits of considerable variation without departing from the essentials. For example, the angles shown may all be made right angles or otherwise varied, it being sufficient for the purposes of the invention if the tines or teeth portions in blank extend from the head-stock in broken lines, that is to say, if each tine extends from the head-stock at one angle for a portion of its length and then at a different angle or angles the remainder of its length, or if it be of zig-zag formation. It is desirable, however, so to form the blank that the stock for the teeth or tines all extends in one general direction from the stock for the head in order that the line of the head may be preserved without reforming from blank to finished product. Such a blank being formed, the portions of stock for the teeth or tines therein are then straightened simultaneously by placing the blank in a machine which may be of the kind now used with the exception that instead of means for straightening a single tooth it embraces the multiplication of such means placed side by side at distances regulated to fit the separated stock for teeth or tines of the blank. After the stock for the teeth or tines has been straightened, the teeth or tines are all simultaneously rolled or drawn to size, shape and length by means of a machine which may embody the same means now employed but multiplied and placed adjacent to each other so as to receive the separated stock for the teeth or tines of the blank. I do not describe the means for straightening or drawing or rolling because such means are well understood in the art and in the practice of my invention it is only necessary to arrange a sufficient number of them in position to receive the separated stock for the teeth or tines of the blank. And I do not describe the manner of forming the head because it forms no part of the present invention and may be accomplished in the manner well understood in the art. My invention relates to the blank by means of which the manufacture of such implements is cheapened and improved.

I claim:—

1. A blank for making tined implements of the class described, comprising a section of metal stock sufficient to form two similar implements, said section of metal stock having two sides for forming the heads of such implements, and portions intermediate said sides consisting of separated metal to form tines, such separated metal comprising a plurality of intermeshing sections, each adjacent section being integral with the opposite side and extending at an angle thereto, then parallel with said sides for a short distance, then at an angle to said sides, and again parallel therewith, whereby the last mentioned parallel section of one tine will be parallel with the first mentioned parallel section of another tine, and whereby the angular sections of both such tines coincide.

2. A blank for rakes, forks and hooks comprising a straight portion of stock for the head and portions of the stock for the teeth or tines separated from each other by substantially the distance which separates the completed teeth or tines, all extending in the same general direction from one side of the head stock, with the blank considered as flat, at angles with the line of the head stock for some distance therefrom and at different angles throughout the remainder of their length, with the outer ends of the parts of the stock for the teeth or tines extending in line with one another and parallel with the head stock.

3. A blank for making tined implements of the type described comprising a plate of metal stock, the two edges supplying metal for the heads of the implements, and a section intermediate the edges consisting of intermeshing tines having their extremities approximately parallel with the edges and of a length corresponding substantially to the distance which separates the tines when the implement is completed.

4. A blank for making tined implements of the class described comprising a plate of metal, the two edges supplying metal for the heads of the implements, and a section intermediate the edges consisting of a plurality of angularly disposed intermeshing tines, each tine arranged in a broken line so that its first bend is such a distance from the edge that it permits space for the intermeshing portion of the adjacent tine.

5. A blank for making tined implements of the class described comprising a plate of metal, the two edges supplying metal for the heads of the implements, and a section intermediate the edges consisting of intermeshing tine portions, each tine portion extending from one head in a broken line, the outer part of which is parallel to the opposite head portion.

6. A blank for making tined implements comprising a section of metal having sides for forming the heads of such implements and a portion intermediate said sides comprising a plurality of angular tine sections, each adjacent tine section being integral with an opposite side and extending in a broken line therefrom, the point at which the tine section on one side makes its first bend being at a point distant from its side corresponding to the width of the adjacent tine section, and the tine section of an opposite side having its extremity parallel to a side and of approximately the length corresponding to the distance between the tines when the parts of the blank are separated.

LARNED S. WHITNEY.

Witnesses:
LEWIS B. SENIF,
PATRICK A. LANE.

Copies of this patent may be obtained for five cents each, by addressing the "Commissioner of Patents, Washington, D. C."